Nov. 13, 1956    YUIN C. SHEN ET AL    2,770,139
HERMETICALLY SEALED TORQUE TRANSMISSION SYSTEM
Filed Nov. 26, 1952    2 Sheets-Sheet 1
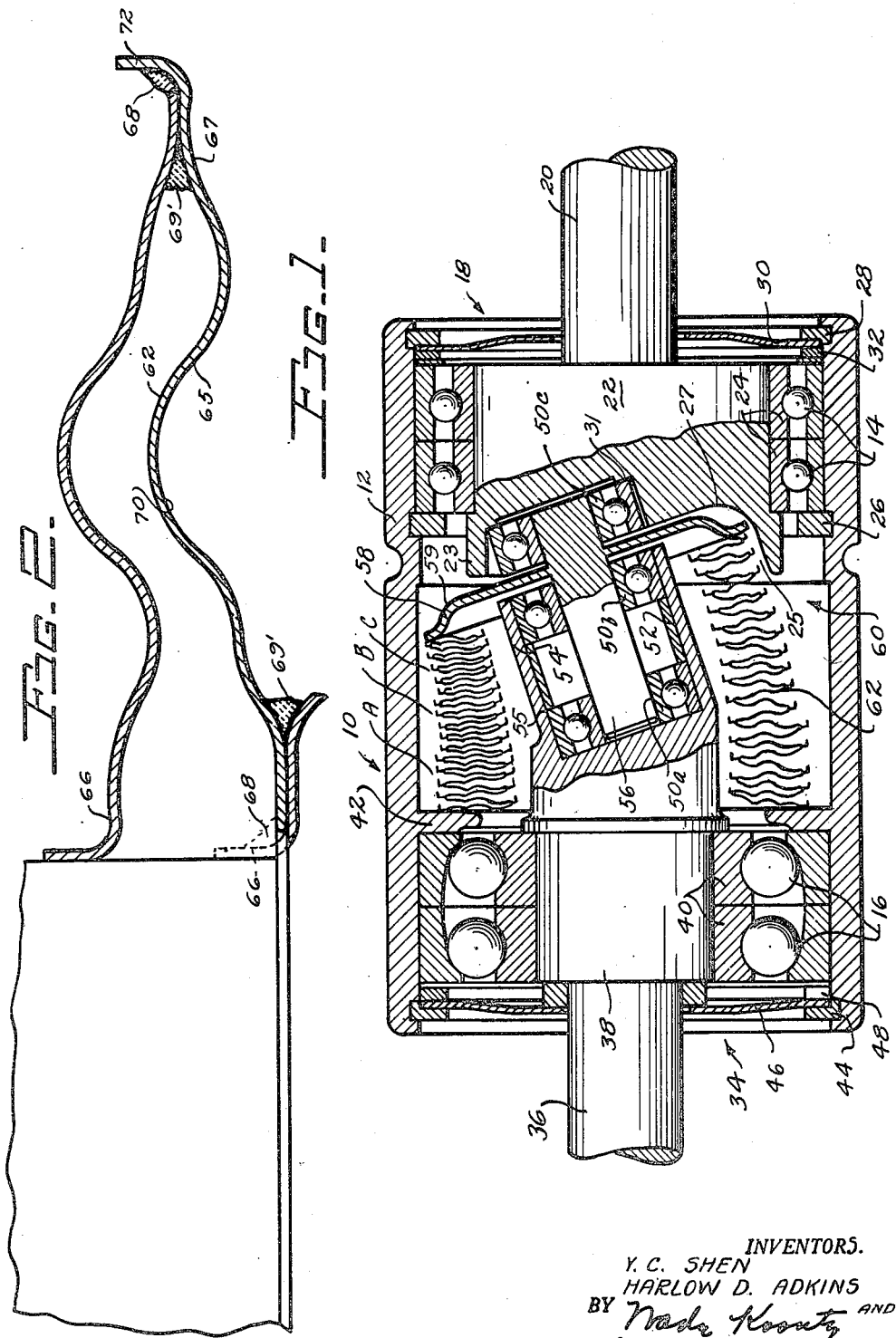
INVENTORS.
Y. C. SHEN
HARLOW D. ADKINS
BY
ATTORNEYS Nov. 13, 1956  YUIN C. SHEN ET AL  2,770,139
HERMETICALLY SEALED TORQUE TRANSMISSION SYSTEM
Filed Nov. 26, 1952  2 Sheets-Sheet 2
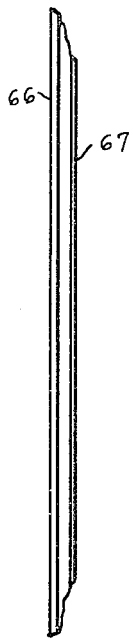
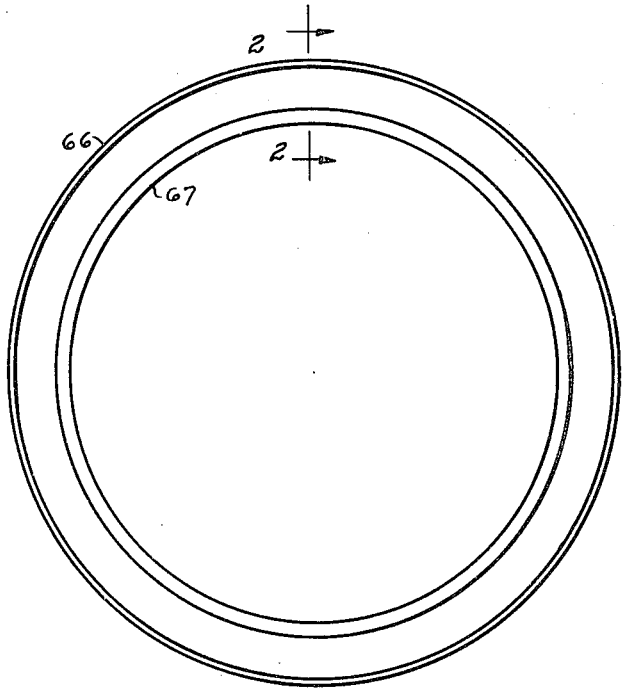
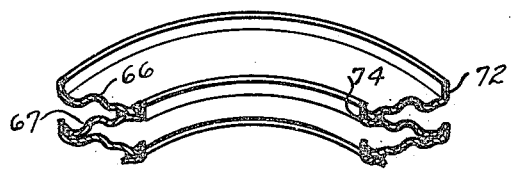
INVENTORS.
Y. C. SHEN
HARLOW D. ADKINS
BY Nade Koontz AND
Frederick W. Cotterman
ATTORNEYS

United States Patent Office 2,770,139
Patented Nov. 13, 1956

2,770,139

HERMETICALLY SEALED TORQUE TRANSMISSION SYSTEM

Yuin C. Shen, Great Notch, and Harlow D. Adkins, Wortendyke, N. J., assignors to the United States of America as represented by the Secretary of the Air Force Application November 26, 1952, Serial No. 322,642

4 Claims. (Cl. 74—18.1)

This invention relates to a device for transmitting torque or rotation between two rotatable elements, where the two elements are physically separated into different pressure and/or humidity environments as for example where the driving element is arranged to operate under atmospheric pressure while the driven element is arranged to operate in a vacuum or vice versa.

The invention is an improvement on a unit known as the "Hermeflex" unit such as shown in Patents 2,419,074 or 2,454,340. In this unit there is interposed, intermediate its ends, a sealed flexible wall or bellows which separates the space within into two pressure tight compartments either of which may contain the driving element and the other the driven element, or, where either compartment is intended to operate under atmospheric pressure, that compartment need not be pressure tight. Prior transmission systems of this type were bulky, costly and complex because of the necessity to maintain the physical separation of the driving element and the driven element. In addition the bellows employed in these systems were not capable of withstanding continued cyclic flexing at high speeds. Therefore, a principal object of this invention is to devise a hermetically sealed torque transmission system which is compact, simple in construction and durable.

A further object of this invention is to devise a hermetically sealed torque transmission system capable of continuous high speed operation.

The device whereby this is accomplished is described in the following specification and is shown in the drawing, wherein Fig. 1 is a longitudinal axial section through an exemplification of the invention herein disclosed;

Fig. 2 is an enlarged partial section taken at 2—2 of Fig. 4 showing some of the details of construction to an enlarged scale.

Fig. 3 is an edge elevational view of one of the bellows elements;

Fig. 4 is an end elevational view of one of the bellows elements;

Fig. 5 is a sectional perspective view of several of the bellows elements and the manner in which they are joined to compose a bellows.

Like reference characters refer to like parts throughout the several views.

Referring first to Fig. 1, a unit 10 of our invention comprises a housing 12 having opposite ends bored in axial alignment for antifriction bearings 14 and 16.

Rotatable in antifriction bearings 14 is a driving member 18 which comprises, integrally, a drive shaft 20 having the inner end portion 22 enlarged to fit into the inner races 24 of the bearings 14.

Bearings 14 are held in a housing 12 against axial movement between spring rings 26 and 28 which also hold cover plate 30 and spacer ring 32 in place.

Rotatable in antifriction bearings 16 is a driven member 34 which comprises, integrally, a driven shaft 36 enlarged at 38 to fit into the inner races 40 of the bearings 16.

Bearings 16 are held in the housing 12 against axial movement between an annular rib 42 which is integral with the housing and a spring ring 44. Coverplate 46 and spacer ring 48 are held by the same spring ring. The axis of the inner end 54 of the driven shaft 36 is set at an acute angle with the axis of the main shaft as shown, whereby rotation of the drive shaft 20 will cause equal angular rotation of driven shaft 36.

The inner end of shaft 36 is recessed to form an integral cylindrical cup portion 55. The longitudinal axis of the cup portion forms an extension or continuation of the axis of shaft 36 and makes an acute angle with it. Crank bearings 50a and 50b along with spacer 52 are mounted in cup portion 55 to provide a rotatable bearing seat for an end of crank shaft 56. A disc element 58 is integrally connected to crank shaft 56 and is perpendicular thereto. The end 23 of shaft portion 22 is closely adjacent cup portion 55 and is recessed at 25 to receive disc element 58. This recess is inclined toward the axis of shaft portion 22 and has a surface 27 parallel to a surface 59 on disc element 58. A socket 31 is in recess 25 and is aligned with cup portion 55. Crank bearing 50c is positioned in this socket to provide a rotatable bearing seat for the other end of crank shaft 56. Disc element 58 is substantially equal in size to the end 23 of shaft portion 22 and is partially mounted in recess 25 with surface 59 on the disc element and surface 27 in the housing closely adjacent to each other. With this arrangement disc 58 retains bearing 50a, 50b and 50c in position in cup portion 55 and in socket portion 31. This arrangement permits the size of the end of shaft 22 to be reduced to the size of the disc 58 without sacrificing the durability or strength of the transmission system. In addition, since the disc is partially mounted and telescoped in the end 23 of shaft portion 22 the overall length of the transmission housing can be reduced. Furthermore, this connection between shafts 20 and 36 is very simple and durable and lends itself well to economical manufacture.

A flexible metal bellows 60 is made up of a plurality of perforated flexible metal discs 62, silver soldered together in pairs at their outer and inner edges as shown, see Figs. 2, 3 and 4. The flexible bellows 60 has the one end connected to the peripheral edge of disc 58 by soldering and the other end connected in like manner to the peripheral edge of annular rib 42 formed integral with housing 12, whereby no part of the bellows 60 may rotate.

The bellows 60 shown complete in Fig. 1 is made up of mating pairs of discs in several sizes, in the instant case three sizes, the three sizes being identified by the letters A, B and C, A being the largest, B the next and C the smallest, or if desired, each succeeding disc may be smaller than the one next previous, the object being to provide a completed bellows which is somewhat in the form of the frustrum of a cone. Obviously, the grading of the bellows discs in this fashion permits the inner diameter of housing 12 to be just slightly larger than the bellows elements designated A without sacrificing the overall flexibility of completed bellows 60. It is therefore clear from a study of Fig. 1 that if all the bellows sections or elements were as large as those designated A, then disc A would have to be of larger diameter and would not fit into the housing 12 of the size shown. This arrangement permits the overall diameter of the casing to be decreased resulting in a more compact transmission unit.

By grading the diameter of the bellows elements in the manner shown or suggested, a fairly uniform clearance is maintained in the internal diameter of housing 12 and all the elements of bellows 60. Bellows 60 is formed by the composite of diaphragm elements which are silver brazed together to form a hermetic seal. Fig. 5 shows a cutaway view of several of the discs as they are nested together ready to be silver soldered, one disc being flanged upward at the periphery of the outside of the disc as at 72 and the next disc being flanged upward at the periphery of the opening as at 74.

It will be noticed that the right hand edge of the upper element 66 shown in Fig. 2 bears against a shelf section 67 of element 65 and the joint thus formed is secured by annular silver brazed joints 68 and 69. At the left hand edge 65 and 66 have similar braze joints 68' and 69'.

Each of the bellows elements 65 and 66 has annular corrugations such as 70 about midway between their inner and outer edges and these corrugations merge into annular convolutions formed on each side thereof to give the bellows elements considerable stiffness annularly yet to permit maximum flexibility in a direction normal to the surface of the elements.

A flexible metal bellows built in accordance with the invention just described is capable of being constantly flexed by a motor connected to shaft 11 and it will withstand continued usage for long periods of time with relatively high efficiency, high rotational speed and high permissible torque output.

While, in the foregoing description, the shaft 20 is referred to as the driver and shaft 36 as the driven, obviously this order may be reversed and shaft 36 used as the driver and shaft 20 as the driven.

Having described an embodiment of our invention, we claim:

1. A high speed sealed torque transmission unit comprising a drive shaft, a driven shaft, and a housing, said shafts rotatably mounted in the housing, means connecting said drive shaft and said driven shaft, one of said shafts having a cup portion integral therewith, the longitudinal axis of said cup portion forming an extension of the shaft axis and being at an acute angle thereto, said means connecting said drive shaft and said driven shaft including a crank element coaxial with said cup portion and seated therein, a disc element connected to said crank element, said cup portion closely adjacent an end of the other shaft, the end of said other shaft having a disc receiving recess therein, said disc receiving recess inclined to the axis of said other shaft, a socket in a surface of said disc receiving recess, said socket aligned with said cup portion, said crank element extending from said cup portion to a seat in said socket, said disc element substantially equal in size to the size of the end of said other shaft and positioned partially in said disc receiving recess making an acute angle with the axis of said other shaft, a frustum shaped bellows substantially coaxial with one of said shafts, one end of said bellows sealed to said disc, the other end of the bellows sealed to said housing to isolate said shafts in separate chambers in the housing, said chambers being fluid tight with respect to each other.

2. A high speed sealed torque transmission unit comprising a drive shaft, a driven shaft, and a housing, said shafts rotatably mounted in said housing, means connecting said drive shaft to said driven shaft, one of said shafts having a cup portion integral therewith, the longitudinal axis of said cup portion forming an extension of the shaft axis and being at an acute angle thereto, said means connecting said drive shaft and said driven shaft including a crank element coaxial with said cup portion and seated therein, a disc element connected to said crank element, said cup portion closely adjacent an end of the other shaft, the end of said other shaft having a disc receiving recess therein, said recess inclined to the axis of said other shaft and having an inner surface parallel to a surface on said disc element, a socket in a surface of said disc receiving recess, said socket aligned with said cup portion, said crank element extending from cup portion to a seat in said socket portion, bearing means in said cup portion and in said socket portion spacing said crank element from the inner surface of said cup portion and said socket portion, said disc element substantially equal in size to the size of the end of said other shaft and positioned partially in said disc receiving recess making an acute angle with the axis of said other shaft and holding said bearing means in position in said cup portion and said socket portion, a frustum shaped bellows substantially coaxial with one of said shafts, one end of said bellows sealed to the periphery of said disc, the other end sealed to said housing to isolate said shafts in separate chambers in the housing, said chambers being fluid tight with respect to each other.

3. The apparatus set forth in claim 1 wherein said bellows comprises different sized groups of corrugated discs said groups connected together to form a frustum shaped bellows, each group composed of two series of elastic corrugated discs, each disc having a central opening therethrough to receive one of said shafts, said discs being alternately flanged and secured together at their inner and outer peripheries.

4. The apparatus set forth in claim 2 wherein said bellows comprises different sized groups of corrugated discs said groups connected together to form a frustum shaped bellows, each group composed of two series of elastic corrugated discs, each disc having a central opening therethrough to receive one of said shafts, said discs being alternately flanged and secured together at their inner and outer peripheries.

References Cited in the file of this patent

UNITED STATES PATENTS

| 1,301,948 | Kaplan | April 29, 1919 |
| 1,378,118 | Jacobsen | May 11, 1921 |
| 1,731,009 | King | Oct. 8, 1929 |
| 1,789,700 | Persons | Jan. 6, 1931 |
| 2,449,772 | Gilman | Sept. 21, 1948 |
| 2,551,847 | Nelson | May 8, 1951 |
| 2,659,569 | Ehlke | Nov. 17, 1953 |

FOREIGN PATENTS

| 404,652 | Italy | June 25, 1943 |